(12) United States Patent
Wechsler

(10) Patent No.: US 7,549,392 B2
(45) Date of Patent: Jun. 23, 2009

(54) REFILLING FEATURE FOR USE IN AN ANIMAL FEEDER

(76) Inventor: Lawrence I. Wechsler, One Wooleys La., Great Neck, NY (US) 11023

( * ) Notice: Subject to any disclaimer, the term of this patent is extended or adjusted under 35 U.S.C. 154(b) by 398 days.

(21) Appl. No.: 09/951,383

(22) Filed: Sep. 13, 2001

(65) Prior Publication Data

US 2005/0028743 A1   Feb. 10, 2005

Related U.S. Application Data

(63) Continuation of application No. 09/588,428, filed on Jun. 6, 2000, now abandoned, which is a continuation of application No. 09/037,577, filed on Mar. 10, 1998, now abandoned.

(60) Provisional application No. 60/040,389, filed on Mar. 11, 1997.

(51) Int. Cl.
*A01K 39/01* (2006.01)

(52) U.S. Cl. .................................. 119/52.2; 119/57.8

(58) Field of Classification Search ............... 119/52.2, 119/52.1, 57.8, 72
See application file for complete search history.

(56) References Cited

U.S. PATENT DOCUMENTS

| | | | | |
|---|---|---|---|---|
| 4,040,389 A | * | 8/1977 | Walters ..................... | 119/52.1 |
| 4,732,112 A | * | 3/1988 | Fenner et al. ............... | 119/52.2 |
| 5,183,005 A | * | 2/1993 | Tyler .......................... | 119/52.2 |
| 5,269,242 A | * | 12/1993 | Toldi .......................... | 119/52.2 |
| 5,423,291 A | * | 6/1995 | Daugherty ................... | 119/77 |
| 5,479,879 A | * | 1/1996 | Biek .......................... | 119/52.2 |
| 5,634,429 A | * | 6/1997 | Loomis et al. ............... | 119/52.2 |
| 5,636,592 A | * | 6/1997 | Wechsler ................... | 119/52.1 |
| 5,655,477 A | * | 8/1997 | Hoffman et al. ............ | 119/52.2 |
| 5,823,135 A | * | 10/1998 | Gilchrist et al. ............ | 119/52.2 |

* cited by examiner

*Primary Examiner*—Son T. Nguyen

(57) ABSTRACT

In a feeder for dispensing flowable feed material, such as potable liquids and particulate solids, to birds and other animals, in which a hopper supplies such feed material to an access port in a feeding station positioned below the hopper, a refilling feature permits facilitated replacement of feed stock, as necessary. A hopper, for example a feed containing reservoir, is mountably receivable on a feeder support structure, which, while mounted thereto, is pivotable between an inverted position, in which an opening therein is appropriately located to permit outflow of feed therethrough while actively providing feed material to the feeding station for animal access, and another position in which the reservoir opening is oriented to prevent outflow of feed, thereby permitting removal of the reservoir from the feeder for refilling, or replacement thereof with a pre-filled replacement reservoir, without significant spillage of the contents. A feeder incorporating such feature advantageously includes mounting structure to facilitate mountable reception of same on a cage, or outdoor tree or other support, such mounting structure being disposed as not to impede the mounted movement of the feed reservoir.

4 Claims, 6 Drawing Sheets

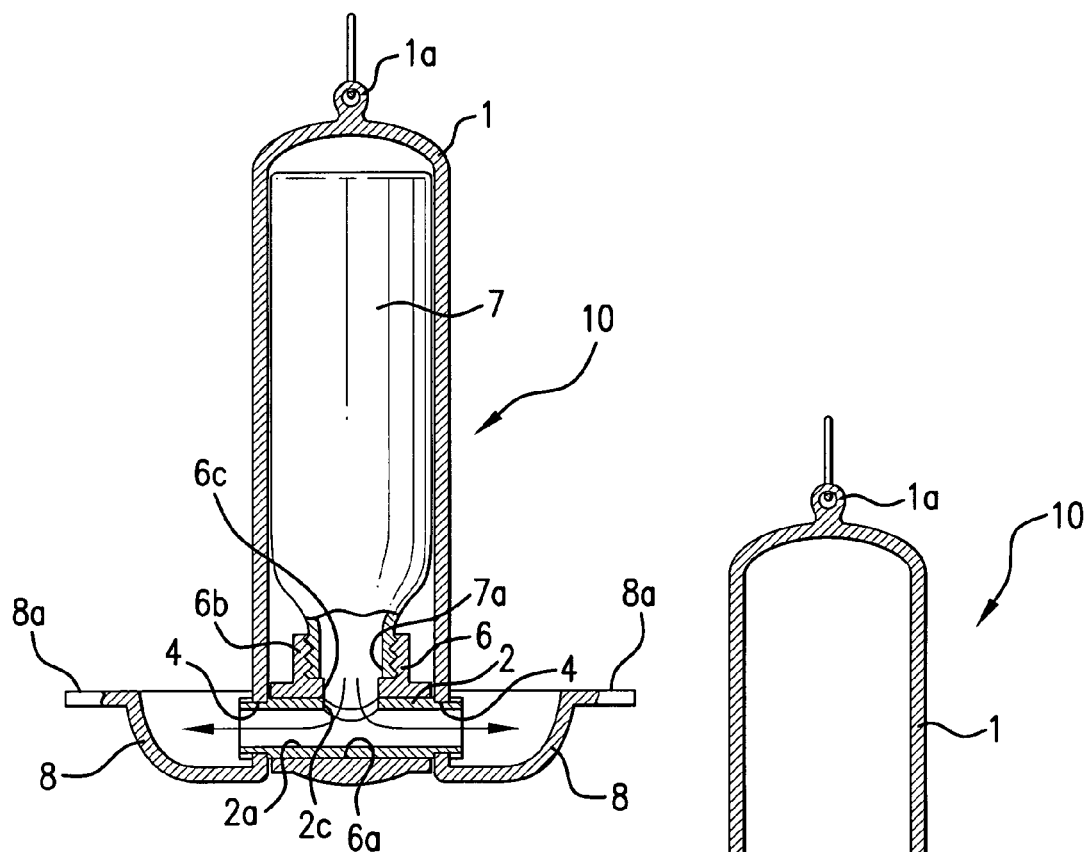
FIG.1a
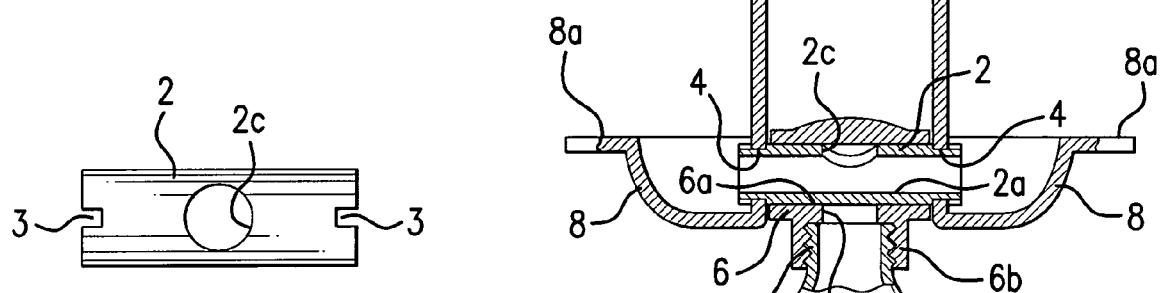
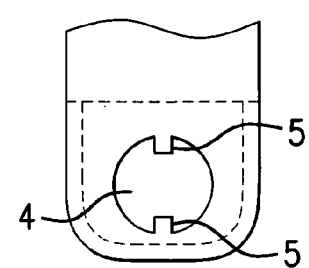
FIG.2a
FIG.2b  FIG.2c
FIG.1b

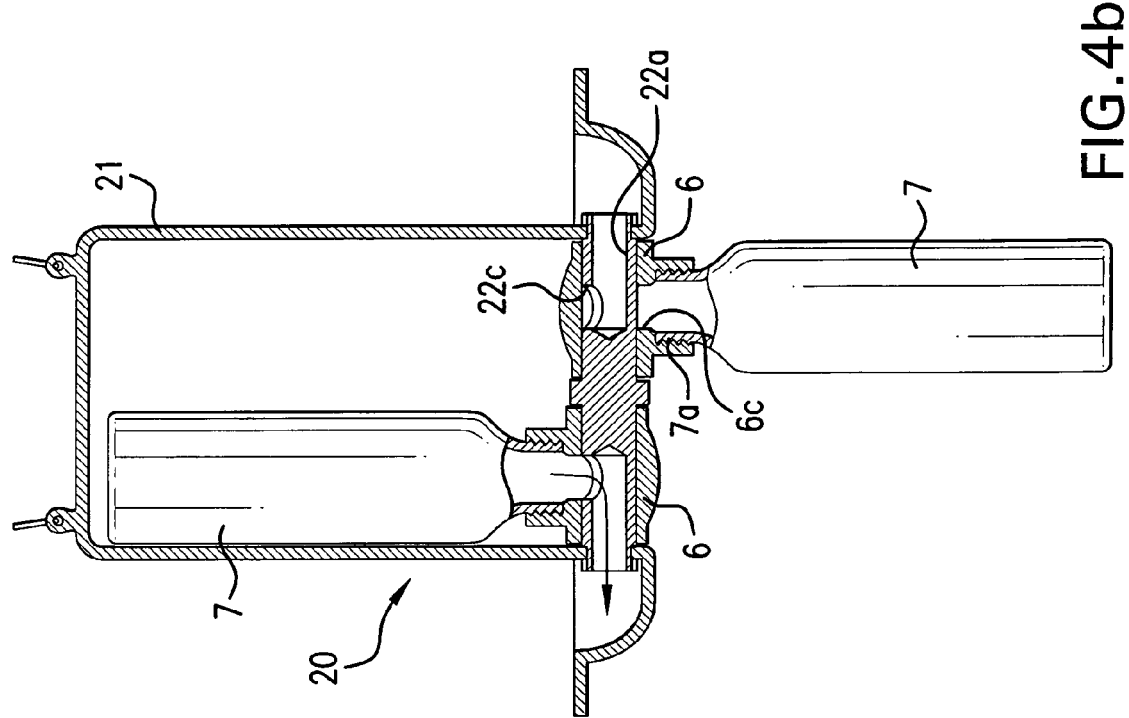
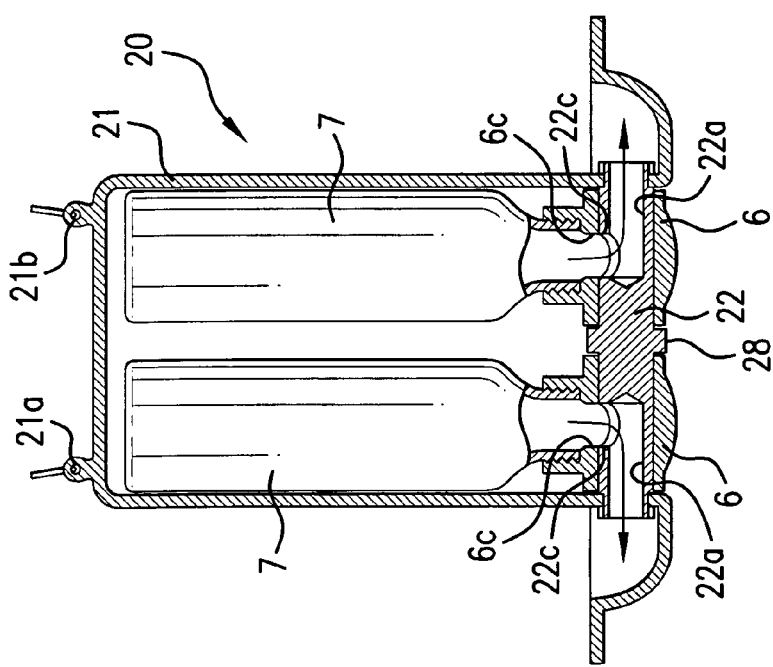

REFILLING FEATURE FOR USE IN AN ANIMAL FEEDER

CROSS REFERENCE TO RELATED APPLICATIONS

This application is a continuation of application Ser. No. 09/588,428 filed Jun. 6, 2000 now abandoned entitled REFILLING FEATURE FOR USE IN AN ANIMAL FEEDER which in turn is a continuation of prior application Ser. No. 09/037,577 filed Mar. 10, 1998 now abandoned entitled REFILLING FEATURE FOR USE IN AN ANIMAL FEEDER which application claims the benefit of U.S. Provisional application No. 60/040,389 filed Mar. 11, 1997 entitled REFILLING FEATURE FOR USE IN AN ANIMAL FEEDER.

BACKGROUND OF THE INVENTION

The present invention relates to animal feeders, and more particularly a feature, which when incorporated in a bird or other animal feeder, simplifies the refilling procedure thereof.

Animal feeders for supplying water and other flowable animal feeds, such as seeds, pellets, nuts, etc., on an as needed basis, are known in the art. Such devices, directed to dispensing of seeds and the like, for example including many commonly available bird feeders, generally provide a storage reservoir or hopper portion for holding feed material, and at least one port or opening formed in a feed access portion of the feeder positioned below a level of the feed contents stored in the hopper to allow the animal access to the feed on demand. As feed material is withdrawn therefrom by the animal, the empty space is displaced by the contents from above within the hopper acted upon by the downward force of gravity. If the access port is small enough in relation to the size of the particulate feed material contained in the hopper, feed material does not escape through the port unless taken therefrom by the animal. Many bird feeders, having larger access ports, are additionally provided with pooling trays adjacent the port for holding a quantity of the feed material which naturally pours from the port holes. A similar configuration is adopted for water feeders, in which water is generally maintained in a water holding reservoir, and having a pooling tray for receiving a quantity of water which escapes though an opening in communication with the reservoir which is disposed below an upper lip of the tray. Such construction permits water to pour from the reservoir and fill the tray without overflowing same, by virtue of the downward force exerted by atmospheric pressure on the surface of the water in the tray. As an animal drinks from the filled tray, water from the reservoir replaces the consumed amount and maintains water in the pooling tray at a constant level just above the opening.

When the nutritive feed material or water in the hoppers or reservoirs is depleted, requiring replenishment, refilling of such devices generally requires either that feed be added through a reclosable opening disposed in at the top of the hopper while mounted, or, where the reservoir is detachable from the rest of the feeder and has a downwardly facing opening therein during mounted use, that the entire feeder be removed from the fixed object to which it is mounted, such as a tree branch from which it normally hangs during use, to allow the reservoir to be removed and inverted for refilling and subsequent reattachment to the feeder. The above refilling operations are generally time consuming, and invariably result in spilled feed material, even when a funnel is used to facilitate transfer of seed and the like from bulk storage to the feeder hopper.

There has therefore long existed the need for a feature which could simplify the refilling of an animal feeder, and which avoids the problems highlighted above.

OBJECTS AND SUMMARY OF THE INVENTION

Accordingly, it is an object of the invention to provide an animal feeder, which overcomes the drawbacks of the prior art.

It is a further object of the invention to provide a feature, which when incorporated an animal feeder design, facilitates the process of refilling.

It is a still further object of the invention to provide a bird or other animal feeder in which feed loss or spillage during refilling is minimized, and which operation does not require detachment of the entire feeder from its mounting on a cage or outdoor support.

Briefly stated, there is provided, in a feeder for dispensing water, potable liquids, particulate solids and other like flowable feed material to birds and other animals, a structural feature permitting simplified refilling of a contents thereof. The feeder is of a type, for example, which includes at least one animal feeding station communicative with a feed containing reservoir mountably receivable on the feeder. For particulate feed, such as seeds, the feeding station conveniently includes an animal feed access port or ports, configured either small enough to prevent spillage of the feed contents, or sufficiently large to permit spontaneous emptying of the feed material therethrough, and in which case trays are provided under and adjacent to each animal access port in which the feed material is allowed to pool, but not overflow. A feature in accordance with the invention permits mountable reception of a reservoir on a feeder support structure, which, while mounted thereto, is pivotable between an inverted position, in which an opening therein is appropriately located to permit outflow of feed therethrough while actively providing feed material to the feeding station for animal access, and another position in which the opening is oriented to prevent outflow of feed, thereby permitting removal of the reservoir from the feeder for refilling, or replacement thereof with a pre-filled replacement reservoir, without significant spillage of the contents. Means are advantageously provided to facilitate mounting of the feeder to a cage, or outdoor tree or structure, such means being disposed as not to impede the mounted pivoting of the reservoir.

An embodiment in accordance with the invention is directed to use as part of an outdoor bird or other animal feeder, and conveniently includes a bilaterally configured support to facilitate hanging of the feeder from an elevated support, for example a branch. Such bilateral support, resembling an upside down "wishbone", or inverted "U" shape, conveniently includes an eyelet at the top thereof for hanging. Proximate the terminal ends of the downwardly extending portions of the support, and extending between and interconnecting each, is a cylindrical member having a central bore for permitting the passage of feed material to the exterior of the feeder for animal access thereto. The cylindrical member is connected to each bilateral support portion in a manner preventing rotation of the member relative thereto. A valve body is also provided, which includes a crosswise bore for closely receiving the cylindrical member before the latter's attachment between the bilateral support, whereby the valve body is captively retained between the bilateral portions of the support, and pivotable about the cylindrical member. Means are provided atop the valve for mountably receiving a reservoir, conveniently in the form of a threaded portion, for permitting the threadable reception of a bottle reservoir having matching threads disposed about an opening therein. The bottle is thereby pivotably movable between an upright position in which the threaded opening thereof is located sufficiently above a contents retaining portion of the bottle which hangs below the cylindrical member to prevent outflow of feed contents, and an inverted position in which the bottle opening is located sufficiently below the feed retaining portion of the bottle to permit outflow, and the bottle being advantageously received in position between the sufficiently spaced apart bilateral support portions of the feeder. A hole provided in the upwardly facing side of the cylindrical member, and having an bore axis crosswise to that of the central bore of the cylindrical member, provides communication with a corresponding vertical bore in the valve body which communicates with the feed contents of the bottle. By virtue of such configuration, when the bottle is inverted for active feed-providing use and disposed between the bilateral support portions, feed is transferred by the effects of gravity from the bottle reservoir through the central bore of the cylindrical member to the outside at both open ends of central bore, where it can be accessed by animals, particularly birds, wishing to feed. When the bottle is empty of feed, it is simply pivoted about the cylindrical member, for orientation in an upright position wherein the bottle opening is located at an elevation sufficiently above a lower internal feed retaining region of the bottle to prevent outflow of contents therethrough by virtue of gravity. The cylindrical member and the valve body operate together as a stopcock valve, preventing any feed remaining in the bore of cylindrical member from emptying into the bottle when so pivoted. The bottle may then be unscrewed from the feeder for refilling and subsequent replacement substantially without loss of seeds or the like, and the bottle then pivoted into the inverted, use-oriented position.

A further embodiment permits mounting of more than one reservoir on a support structure configured analogously with that of the aforementioned embodiment. A bilateral support of inverted "U" shape presents downwardly extending portions separated by a distance sufficient to permit reception of two reservoirs therebetween. Valve means are conveniently provided in a manner in accordance with the above embodiment. Each reservoir is received on a corresponding valve body member, which is in turn rotatably received about opposed ends of a cylindrical member captively and non-rotationally held between downwardly extending portions of the bilateral support structure. The cylindrical member is provided with two blind bores having openings in opposed ends thereof, each bore communicating with the contents of one of the reservoirs, such that an animal will have access to the contents of a particular reservoir by selection of corresponding end of the cylindrical member.

In an other embodiment directed to mounting of more than one reservoir, an alternative support structure utilizes a central support rather than the aforementioned bilateral approach, operating in other respects in a manner analogous with the aforementioned multiple reservoir embodiment.

In yet a further embodiment directed to a feeder for providing water or flowable feed material to captive animals, particularly, but not exclusively, those in barred cages, a feeder is provided with means for pivoting a feed holding reservoir from an inverted, use-oriented position, to a position in which the reservoir is oriented in an upright position, for removal, refilling and subsequent replacement, functioning analogously to the means described in the aforementioned embodiments. Means are provided for mounting the feeder to the animal enclosure, advantageously such that feed access is provided to the animal while the reservoir is disposed external thereto to permit user contents replenishment and maintenance.

In yet another embodiment, valve means are omitted for simplified construction. In the embodiment, a feed containing reservoir is mountably receivable on a tube shaped member having a continuous bore therethrough communicative with the reservoir contents. The tube shaped member is captively and rotationally received between downwardly extending portions of a bilaterally configured support structure. When replenishment of reservoir feed contents is required, the reservoir is pivoted from an inverted use-oriented position to an upright replacement position, and due to the absence of a valve arrangement, any feed remaining in the tube shaped member falls into the reservoir prior to its removal from the feeder. Where the openings at the ends of the tube shaped member are large enough to permit spontaneous escape of feed material, trays are provided to permit pooling thereof. Optionally, seals, conveniently in the form of o-rings, are provided between the support structure and the tube shaped member to prevent leakage therebetween, particularly where the feeder is used to dispense liquid contents.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 1a is a cross sectional view of an embodiment of the feeder in accordance with the invention, shown in use with the reservoir inverted;

FIG. 1b is a cross sectional view of the embodiment in FIG. 1a, with the reservoir pivoted to an upright orientation prior to removal during a refilling operation;

FIG. 2a is a top view of the cylindrical valve member of FIGS. 1a and 1b;

FIG. 2b is an end view of the cylindrical valve member of FIG. 2a;

FIG. 2c is a partial end view of the feeder support structure of FIGS. 1a and 1b showing the receiving hole for non-rotationally receiving the slotted ends of the cylindrical valve member of FIGS. 2a and 2b therein;

FIG. 4a is a cross sectional view of another embodiment of a feeder in accordance with the invention for receiving a pair of reservoirs, shown in full use, with both reservoirs inverted;

FIG. 4b is a cross sectional view of the embodiment in FIG. 4a, with one of the reservoirs pivoted to an upright orientation prior to removal during a refilling operation;

THE PREFERRED EMBODIMENT OF THE INVENTION

The invention relates generally to a feature, which when incorporated an animal feeder design, facilitates the process of refilling feed material, and in which seed loss or spillage during such refilling process is minimized while obviating removal of the entire feeder from its mounting on a cage or outdoor support. For purposes herein, "feed" and "feed material" are defined as including any flowable caloric or non-caloric substance ingested by an animal, and includes seed, grain, nectar, water, etc., and are used interchangeably herein. As used herein as applied to disposition of the reservoir, the term "upright" is intended to mean a reservoir orientation wherein the reservoir outlet is located at an elevation above any internal region of the reservoir where feed is retained to prevent outflow thereof through the outlet by the effects of gravity. Similarly, the term "inverted" as applied to reservoir disposition is intended to mean a reservoir orientation in which the reservoir outlet is located at an elevation below an internal feed retaining region of reservoir sufficient to initiate outflow of feed by the effects of gravity.

Figure 3:
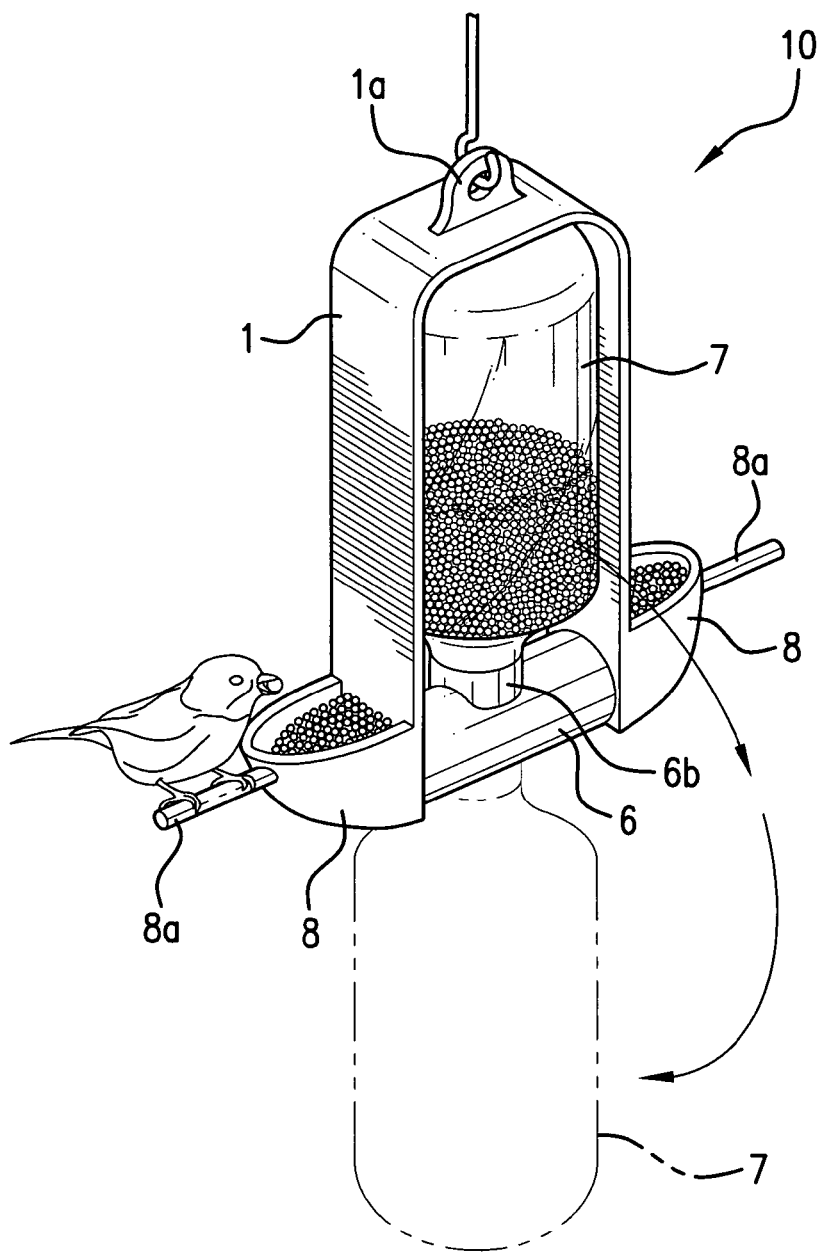
FIG. 3 is a perspective view of the feeder depicted in FIGS. 1a and 1b.

Referring now to the figures, and in particular FIGS. 1a and 1b, a feeder incorporating the features in accordance with the invention and generally designated 10, is suited for use in an aviary, or as an outdoor bird feeder. Feeder 10 includes a bilaterally configured support 1 conveniently of such form resembling an upside down "wishbone", or inverted "U" shape, and optionally includes means for hanging feeder 10 from a tree branch or the like, conveniently provided in the form of an eyelet 1a disposed at a top thereof. Proximate terminal ends of the downwardly extending portions of support 1, and extending between and interconnecting each, is a cylindrical member 2 having a central bore 2a for permitting the passage of feed material to the exterior of the feeder. Cylindrical member 2 is connected to each bilaterally extending portion of support 1 in a manner preventing rotation of the member relative thereto. Referring to FIGS. 2a, 2b and 2c, this is conveniently accomplished by providing slots 3 in opposed ends of cylindrical member 2, shown in top and end views in FIGS. 2a and 2b respectively. Openings 4 are formed in the downwardly extending portions of support 1 for receiving opposed ends of cylindrical member 2. Support 1 is advantageously made of a material sufficiently resilient to permit the downwardly extending portions thereof to be temporarily spread apart to receive cylindrical member captively therebetween when the downwardly extending portions of support 1 are allowed to return to their natural spaced apart distance. Slots 3 in the ends of cylindrical member 2 are configured to receive flanges 5 which protrude into openings 4, as best seen in FIG. 2c, to prevent rotation and lateral movement of cylindrical member 2 when the downwardly extending portions of support 1 are no longer forcibly spread apart. A valve body 6 includes a crosswise bore 6a for closely receiving cylindrical member 2 before the latter's attachment between bilateral support 1, whereby valve body 6 is captively retained between the downwardly extending bilateral portions of support 1, while being pivotable about non-rotatable cylindrical member 2. Means are provided atop valve body 6 for mountably receiving a reservoir 7, conveniently in the form of a threaded portion 6b, for permitting the threadable reception of reservoir, conveniently in the form of a bottle 7, having a matching threaded bottle opening 7a. So mounted, bottle 7 is thereby pivotably movable between an inverted position, in which a threaded bottle opening 7a is located below a feed-retaining portion of bottle 7 which is advantageously received in position between sufficiently spaced apart downwardly extending bilateral portions of support 1, as shown in FIG. 1a, and another position, including an upright position in which threaded opening 7a is depicted as conveniently facing upwardly and bottle 7 is hanging below structure 1 and cylindrical member 2, as shown in FIG. 1b. A hole 2c provided in the upwardly oriented side of cylindrical member 2, and having an bore axis crosswise to that of central bore 2a of cylindrical member 2, provides communication with a corresponding vertical hole 6c in the valve body which communicates with the feed contents of bottle 7. By virtue of such configuration, when bottle 7 is inverted and disposed between the downwardly extending bilateral portions of support 1, as shown in FIG. 1a, feed is transferred by the effects of gravity from bottle reservoir 7 through central bore 2a of cylindrical member 2, to the outside at both open ends of central bore 2a, where it can be accessed by birds wishing to feed. When bottle 7 is empty of feed, it is simply pivoted about cylindrical member 2, which, together with valve body 6 operates as a stopcock valve, for orientation in an upright position in which bottle opening 7a faces upward. Bottle 7 may then be unscrewed from the remainder of feeder 10 for refilling and subsequent replacement, substantially without loss of seeds or the like, and bottle 7 then pivoted into the inverted, use-oriented position. FIG. 3 shows the above described embodiment in perspective, reservoir 7 shown pivoted to refilling positional orientation in phantom.

In the above embodiment as depicted, the feed access portion of feeder 10 includes feed receiving cups 8 disposed on each downwardly extending bilateral portion of support 1 in a position to receive feed transferred thereto from reservoir 7.

Turning now to FIGS. 4a and 4b, an embodiment permitting the mountable reception of more than one reservoir for storage and dispensing of a variety of feed material is depicted, and in which a feeder, generally designated 20 conveniently includes a support 21 of analogous bilateral configuration present in the previously described embodiment, and optionally including means for hanging feeder 20 from a tree branch or the like, conveniently provided in the form of a pair of eyelets 21a and 21b laterally disposed at a top thereof, two being provided to prevent feeder 20 from becoming unbalanced, should the two reservoirs received thereon be emptied at unequal rates. Also in analogous fashion, a cylindrical member 22 extends between, and interconnects each terminal end of downwardly extending portions of support 21. Cylindrical member 22 is connected to each bilaterally extending portion of support 21 in a manner preventing rotation of the member relative thereto, conveniently in a manner analogous to that described with reference to FIGS. 2a, 2b and 2c. A pair of valve bodies 6, each configured as described in the previous embodiment are received about cylindrical member 22 and are optionally separated by a widened portion 28 of cylindrical member 22. Widened portion 28 insures that bottles 7 are sufficiently spaced apart and prevents accidental seepage between cylindrical member 22 and valve body 6 from a one bottle 7/valve 6 combination, for example, containing water to the remaining bottle 7 which may contain seed. Cylindrical member 22 includes crosswise bores 22a extending a distance from opposed ends thereof sufficient to permit communication with the contents of bottles 7 through holes 22c and 6c in cylindrical member 22 and valve bodies 6 respectively which are brought into alignment when bottles 7 are in an inverted orientation as shown in FIG. 4a. When pivoted downward (right bottle in FIG. 4b) vertical hole 6a in valve body 6 and hole 22c in cylindrical member 22 are brought out of alignment, preventing any contents remaining in crosswise bore 22a from spilling into bottle 7 which is upright with threaded opening 7a facing upward. As in the previously described embodiment, valve body 6 and cylindrical member 22 are advantageously fabricated from a material providing self-sealing properties, such as TEFLON or nylon, to create a water-tight stopcock-like seal when liquid is to be dispensed. Furthermore, it is noted that when liquids are involved, a water-tight seal is provided between cylindrical member 22 and support 21 to prevent leakage.

Figure 5:
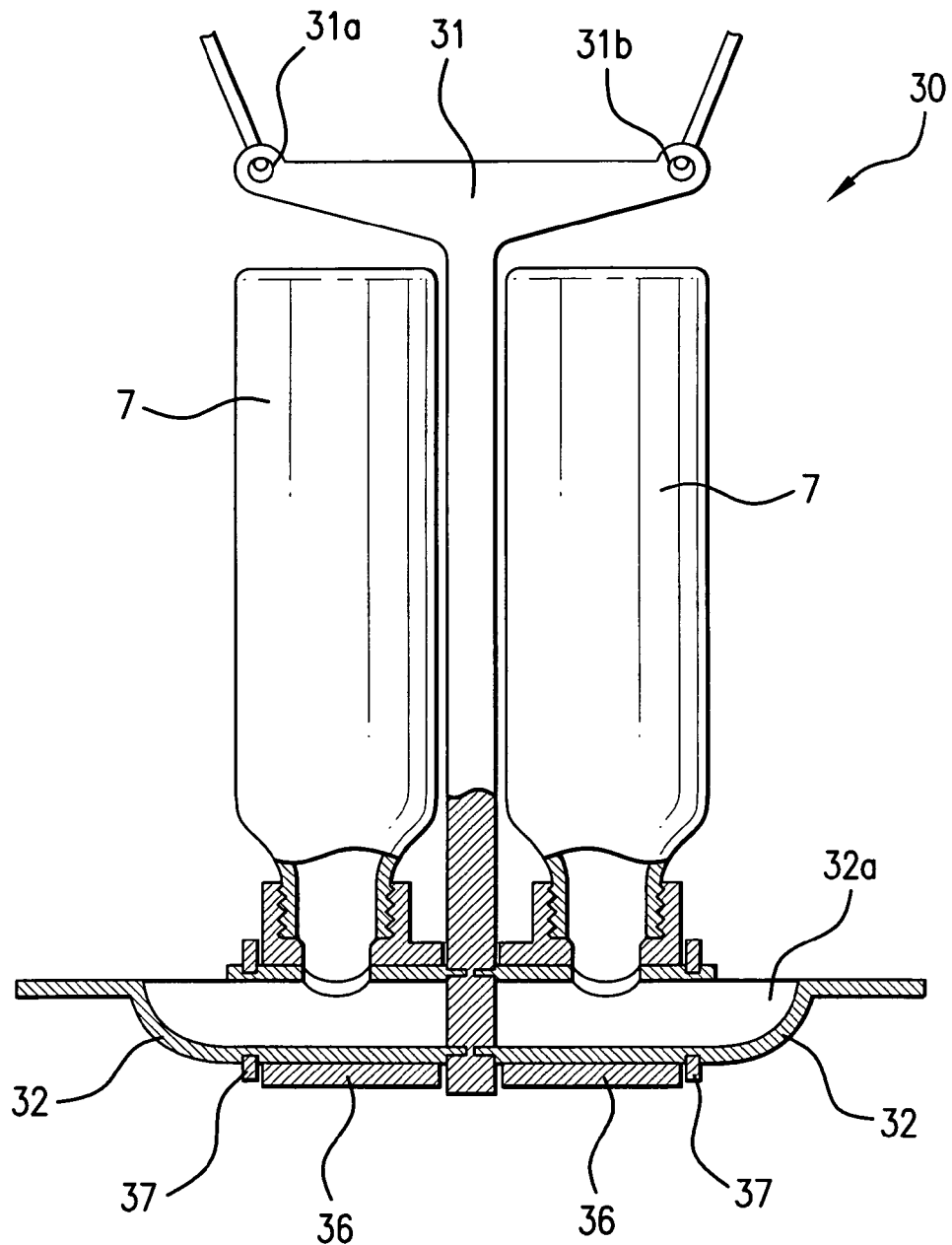
FIG. 5 is a cross sectional view of an alternative embodiment of a feeder in accordance with the invention for receiving a pair of reservoirs and in which a central support structure is utilized.

Turning now to FIG. 5, a feeder in accordance with an alternative embodiment of the invention directed to reception of more than one reservoir is depicted, generally designated 30. Rather than utilizing a bilaterally configured support between which reservoirs are received, a central support 31 vertically extends between a pair of reservoirs 7 pivotably receivable on either side thereof. Means for mounting feeder to a fixed object, such as a tree, are provided conveniently in the form of eyelets 31a and 31b formed in opposed sides of a top portion of central support 31. Central support is advantageously "T" shaped as shown, and hung utilizing both spaced apart eyelets 31a and 31b, in order to prevent feeder 30 from becoming unbalanced, and tilting off the vertical, should reservoirs 7 be emptied at unequal rates. A pair of cylindrical members 32 are fixably mounted to a lower portion of central support 31, and extend in opposed directions outwardly therefrom. Cylindrical members 32 in the embodiment as depicted optionally include cupped end portions 32a for holding feed and presenting same to a bird or other animal. A pair of valve bodies 36 of structure analogous to that of valve bodies 6 in the previously described embodiments are each rotatably receivable on corresponding ones of cylindrical members 32. Means for captively retaining valve bodies 36 on cylindrical members 32 are provided, conveniently in the form of slit rings 37 received in accommodating grooves in cylindrical members 32. Use of feeder 30 is analogous to the previously described embodiment.

Figure 6:
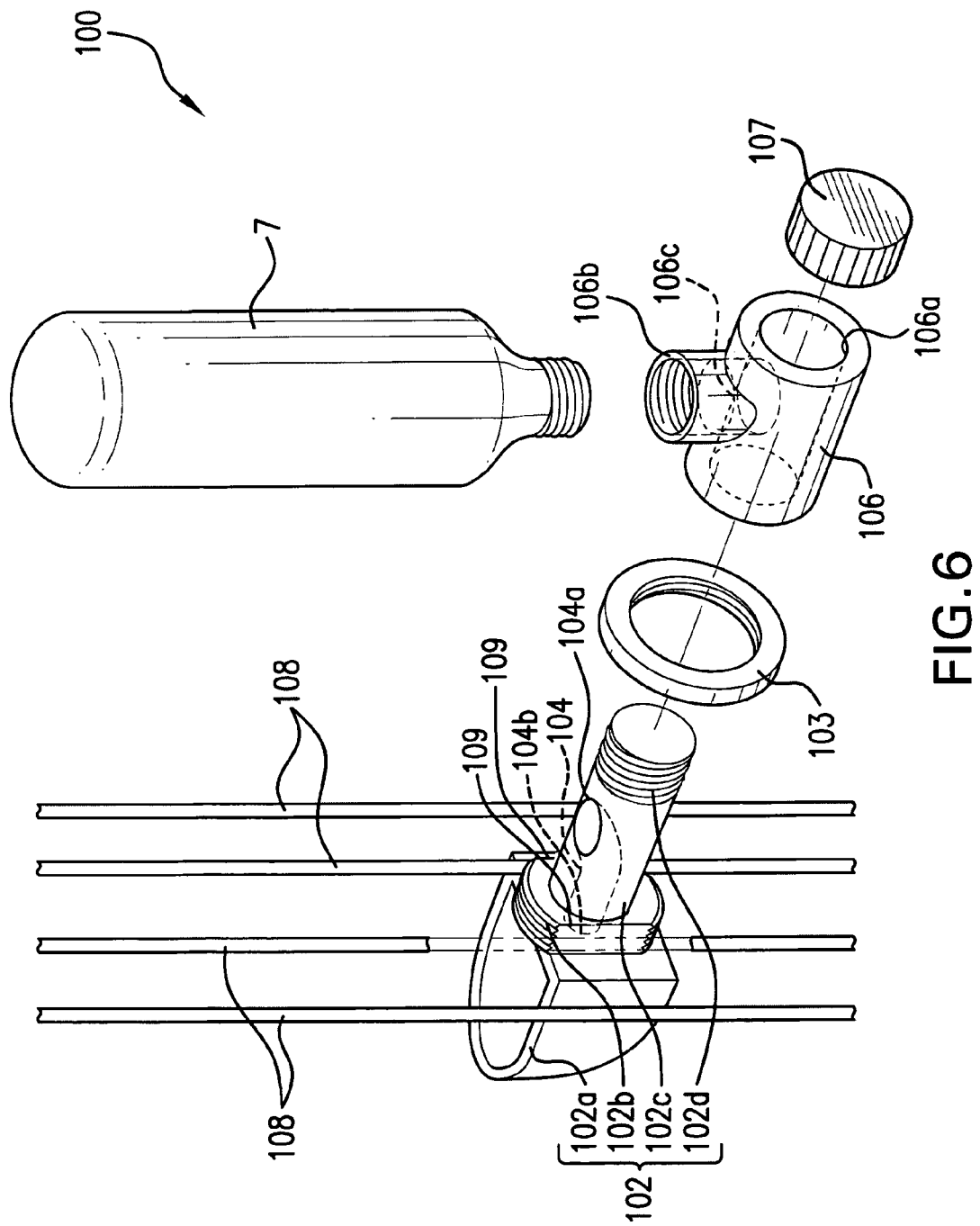
FIG. 6 is a perspective exploded view of an embodiment of a feeder in accordance with the invention directed to use on a bird cage.

Another embodiment, as depicted in FIG. 6, is directed to a feeder, generally designated 100, for providing water or flowable feed material to captive animals, particularly, but not exclusively, those housed in barred cages. Feeder 100 provides means for pivoting a feed holding reservoir from an inverted, use-oriented position, to a position in which the reservoir is oriented in an upright position, for removal, refilling and subsequent replacement, analogous to the means described in the aforementioned embodiments. Feeder 100 includes a cupped valve member 102 conveniently provided as an integrated unit which includes a cupped portion 102a, a locking thread portion 102b, a male valve portion 102c and a threaded end portion 102d. Locking thread portion 102b is receivable through an opening in a side of an animal enclosure, the opening being smaller than cupped portion 102a. As illustrated by the example in FIG. 6, in which the enclosure is shown as a cage having bars 108, the opening being the space therebetween, cupped portion 102a is disposed inside the cage, a remainder of cupped valve member extending through adjacent ones of bars 108. Flats 109 are advantageously provided on locking thread portion 102b, the distance between flats 109 approximating the distance between bars 108 in order to prevent rotation of cupped valve member 102 when same is mounted to the cage. Mounting is accomplished by a locking nut 103 threadably received on locking thread portion 102b, which sandwiches the bars 108 between cupped portion 102a and locking nut 103. A female valve member 106 is provided with a crosswise bore 106a running longitudinally, and dimensioned to receive male valve portion 102c, advantageously in sufficiently close fit to provide a stopcock-like seal (and watertight where feeder 100 is to provide water), yet still permit rotation therebetween. Female valve member 106 includes a threaded portion 106b for receiving reservoir 7. A feed communication bore 104 traversing cupped valve member 102 has a vertically oriented opening 104a along male valve portion 102c at a one end thereof, and a feed opening 104b in communication with the interior of cupped portion 102a at the other end. A vertical hole 106c in female valve member 106 connects the feed contents of reservoir 7 with the correspondingly positioned vertically oriented opening 104a in male valve portion, selectively permitting the flow of feed into cupped portion 102a when reservoir 7 is oriented vertically, and vertical hole 106c and vertically oriented opening 104a are concomitantly in communicative alignment. A retainer nut 107 threads onto threaded end portion 102d of cupped valve member 102, preventing lateral movement, or unwanted escape or removal of female valve member 106 from male valve portion 102c.

During use, reservoir 7 is inverted, as shown in FIG. 6, and feed is transferred therefrom, via vertical hole 106c, into and through feed communication bore 104, where it exits from feed opening 104b and into cupped portion 102a. When refilling of reservoir 7 is desired, it is rotated to an upright orientation, and unscrewed from female valve member 106.

Figure 7:
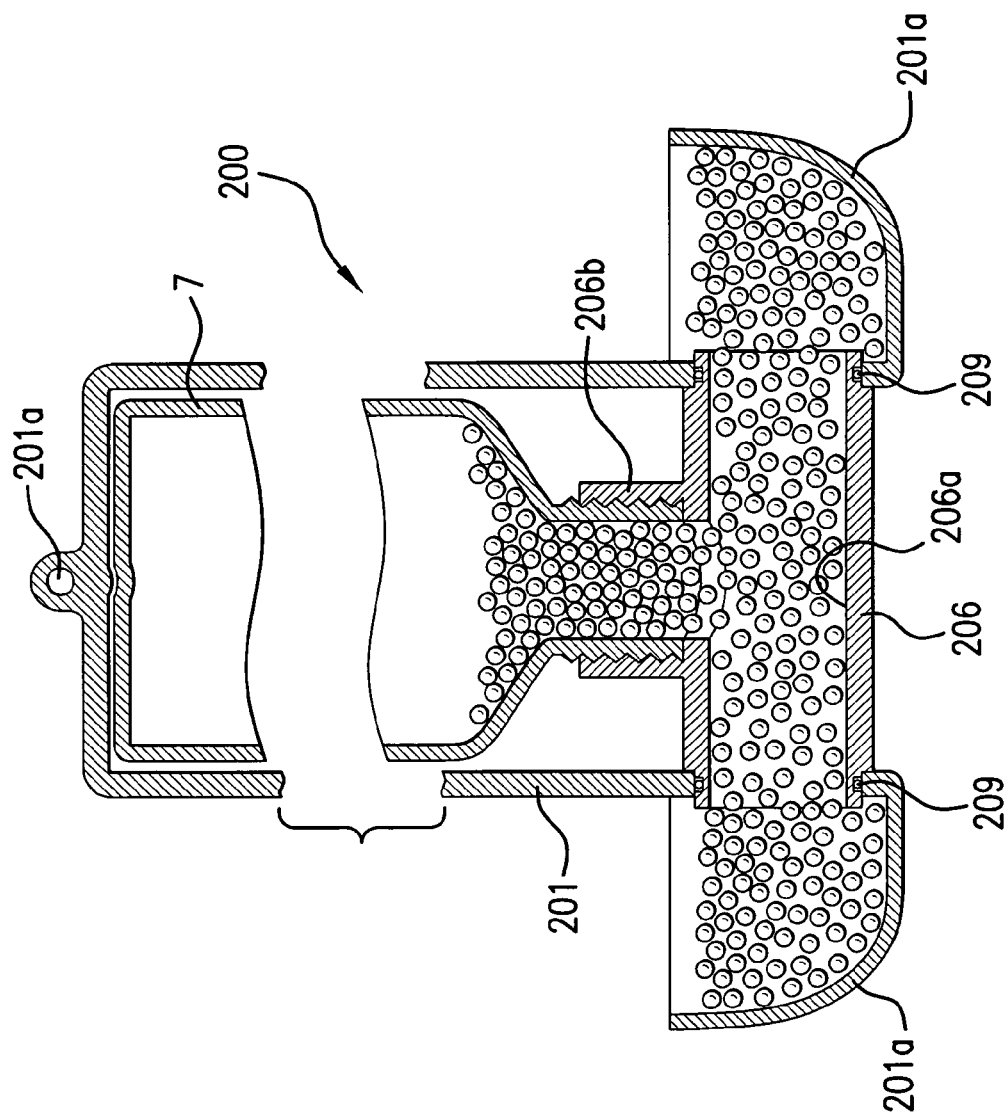
FIG. 7 is a cross sectional view of an alternative valveless embodiment of a feeder in accordance with the invention.

Each of the preceding embodiments include valve means for preventing feed remaining in the feed access portion of the feeder from spilling into the reservoir or onto the ground when the reservoir is moved to the upright position during replacement or refilling thereof. In circumstances where such backspin is not considered an unacceptable inconvenience, such valve means may be omitted, thereby simplifying the necessary structure of the feeder. An example of such a valveless embodiment is depicted in FIG. 7, in which a feeder, designed for outdoor use, is generally designated 200. Feeder 200 includes a bilateral support frame 201 which includes an eyelet 201a to facilitate hanging. A tubular cross-member 206 is rotatably received in captive engagement between a lower portion of support, and optionally sealed with respect thereto, conveniently by means of O-rings 209. Tubular cross-member 206 includes a bore 206a and means for mountably receiving reservoir 7, conveniently a threaded portion 206a, such that an outlet of reservoir 7 is in communication with bore 206. Support 201 includes a pair of cupped portions conveniently integral therewith and located at opposed ends of tubular cross-member 206 for catching feed exiting therefrom for animal consumption. Operation and feed replacement is accomplished in a manner analogous with the previously described embodiments, with the exception that if some feed remains in bore 206a at the time of reservoir replacement, it will fall back into reservoir 7 when same is brought into an upright position for refilling.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. In an animal feeder for dispensing flowable feed material to an animal, in which a feed-containing reservoir supplies such feed material to an access port in a feeding station below a feed containing portion of the reservoir, the feed material being accessible to the animal from said feeding station when said feeding station is in an operable condition, a refilling feature, comprising:
   a housing mountable to a support;
   a reservoir receivable to said housing while said housing is mounted to said support in a manner permitting movement of the reservoir between a first position in which an opening in the reservoir is located below at least a portion of said feed material in said feed containing portion of the reservoir to permit outflow of feed therethrough, and an other position in which the reservoir opening is oriented above said feed material in said feed containing portion of the reservoir to prevent said outflow of feed; and the access port in the feeding station communicating with the feed containing portion of the reservoir when the reservoir is in said first mounted position, movement of the reservoir between the first position and said other position altering a relative orientation of said reservoir with respect to said feeding station, an operable condition of said feeding station being maintainable when said reservoir is moved to the other position.

2. An animal feeder, comprising:

a housing;

at least one feeding station carried on said housing via which feed material is accessible by the animal when said feeding station is in a use orientation; and a reservoir including an opening, said reservoir being receivable to said housing while said reservoir is oriented in a replacement position in which the reservoir is positioned with the opening thereof located above the feed material contained in said reservoir to inhibit outflow of feed when detached from or replaced to the housing in said replacement position, said reservoir being movable to an active position when received to the housing in the replacement position, the use orientation of said feeding station being maintainable when said reservoir is detached or removed from said housing in said replacement position.

3. An animal feeder, comprising:

a housing;

structure defining at least one feeding station via which feed material is accessible by the animal when said at least one feeding station is in a use orientation; and a reservoir including an opening, said reservoir being receivable to, and removable from, said housing when said reservoir is in a replacement orientation in which the reservoir is positioned with the opening thereof upwardly facing to inhibit outflow of feed in said reservoir when detached from or replaced to the housing in said replacement orientation, even when substantially filled with feed, said reservoir being movable, while received to the housing, between the replacement orientation and a feed-supplying orientation in which the opening is downwardly facing and in feed communication with said at least one feeding station, the use orientation of said feeding station being continuously maintainable when said reservoir is moved between said replacement orientation and said feed-supplying orientation.

4. An animal feeder according to claim 3, wherein said reservoir is a bottle having a base and including a bottle axis extending between the base of the bottle and the opening, said bottle axis being arranged at an angle to true vertical when in said replacement orientation, such that said bottle is not entirely upright.

* * * * *